United States Patent
Chao et al.

(10) Patent No.: US 6,948,809 B2
(45) Date of Patent: Sep. 27, 2005

(54) INTERCONNECTING ASSEMBLY IN COMBINATION WITH PRIMARY AND AUXILIARY EYEGLASSES

(75) Inventors: David Chao, Saratoga, CA (US); Ming Che Wu, Chiayi (TW)

(73) Assignee: Contour Optik, Inc., Chiayi (TW)

( * ) Notice: Subject to any disclaimer, the term of this patent is extended or adjusted under 35 U.S.C. 154(b) by 0 days.

(21) Appl. No.: 10/621,284

(22) Filed: Jul. 17, 2003

(65) Prior Publication Data

US 2005/0012891 A1 Jan. 20, 2005

(51) Int. Cl.$^7$ ................................................ G02C 7/08
(52) U.S. Cl. .............................. 351/57; 351/48; 351/58
(58) Field of Search .............................. 351/47, 48, 57, 351/58, 140

(56) References Cited

U.S. PATENT DOCUMENTS

| | | | |
|---|---|---|---|
| 5,883,689 A | * | 3/1999 | Chao ........................... 351/47 |
| 5,929,964 A | * | 7/1999 | Chao ........................... 351/47 |
| 6,113,234 A | * | 9/2000 | Huang ........................... 351/47 |
| 6,113,235 A | * | 9/2000 | Yamamoto ................... 351/113 |
| 6,196,679 B1 | * | 3/2001 | Wong ........................... 351/47 |
| 6,231,180 B1 | * | 5/2001 | Xie ............................ 351/47 |
| 6,264,323 B1 | | 7/2001 | Chao |
| 6,341,864 B1 | | 1/2002 | Ng |
| 6,375,322 B2 | | 4/2002 | Takagi |

\* cited by examiner

*Primary Examiner*—Huy Mai
(74) *Attorney, Agent, or Firm*—Greenberg Traurig, LLP

(57) ABSTRACT

One embodiment of the present invention relates to an eyeglass assembly including a pair of first eyeglasses having a first bridge interconnecting a pair of first lenses, a pair of second eyeglasses having a second bridge interconnecting a pair of second lenses and retainers provided on opposite sides of the first frame. Each retainer may include an upper clamping plate and a lower clamping plate. The lower clamping plate may have at least one restricting groove to correspond to at least one rib so that combination of the at least one rib and the at least one restricting groove is able to combine the first pair of eyeglasses and the second pair of eyeglasses.

12 Claims, 8 Drawing Sheets

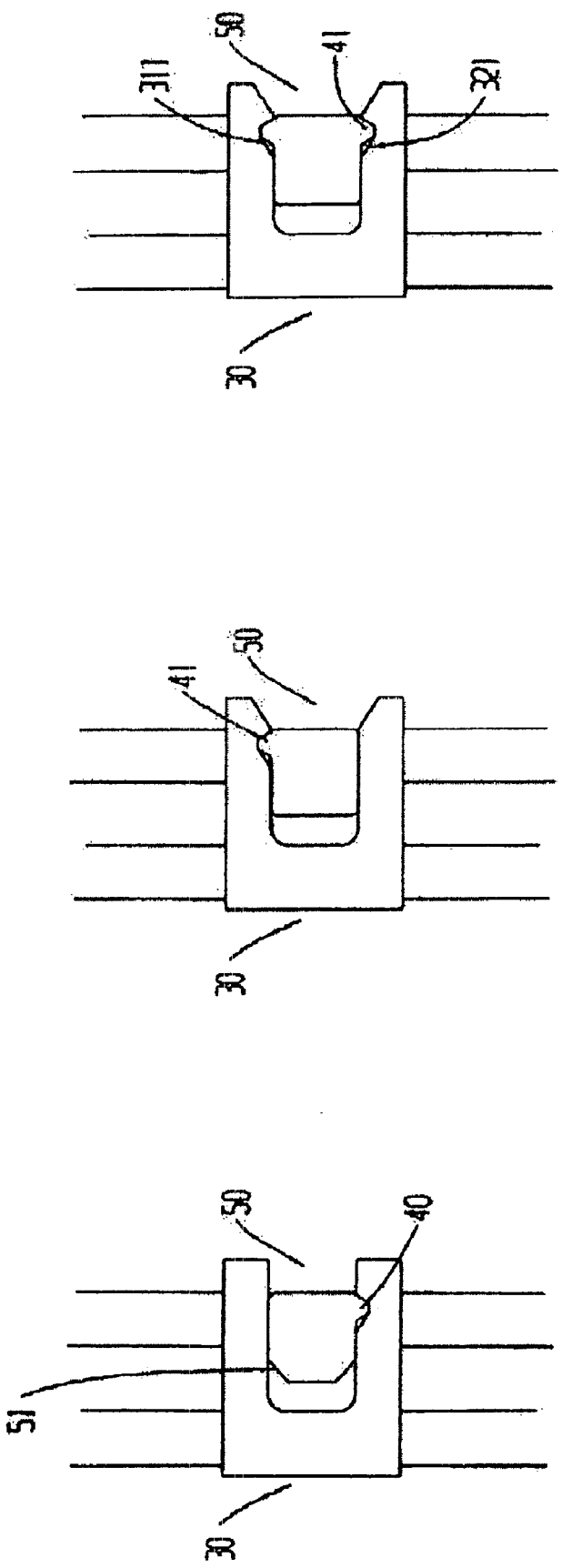

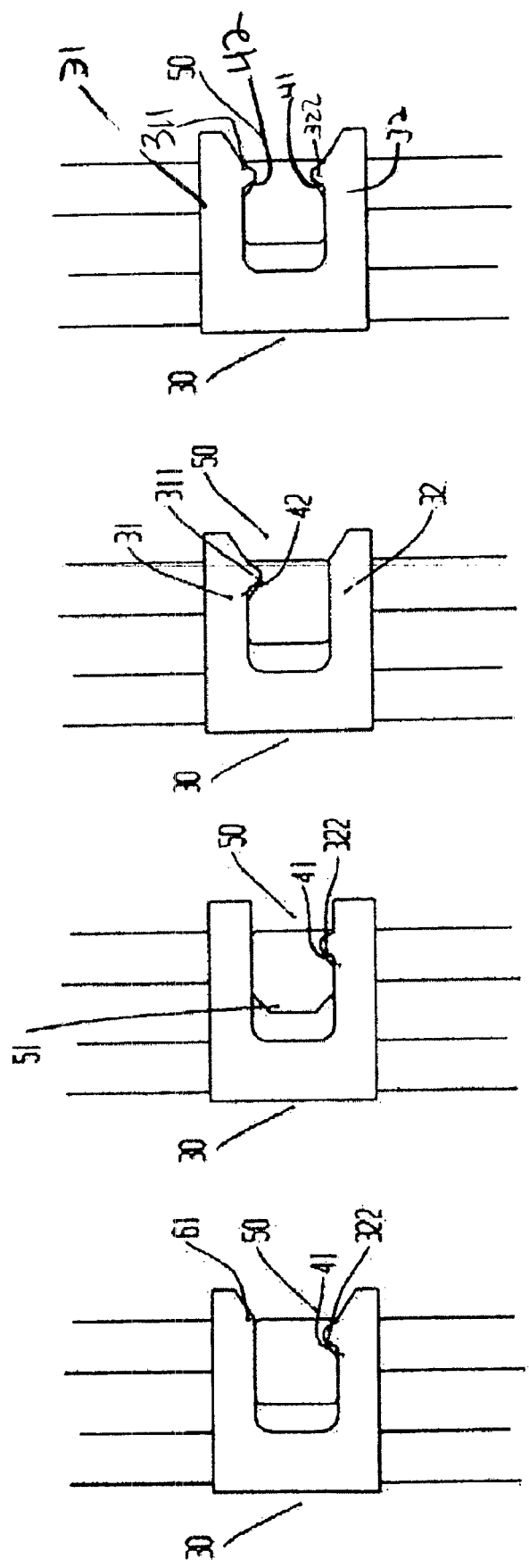

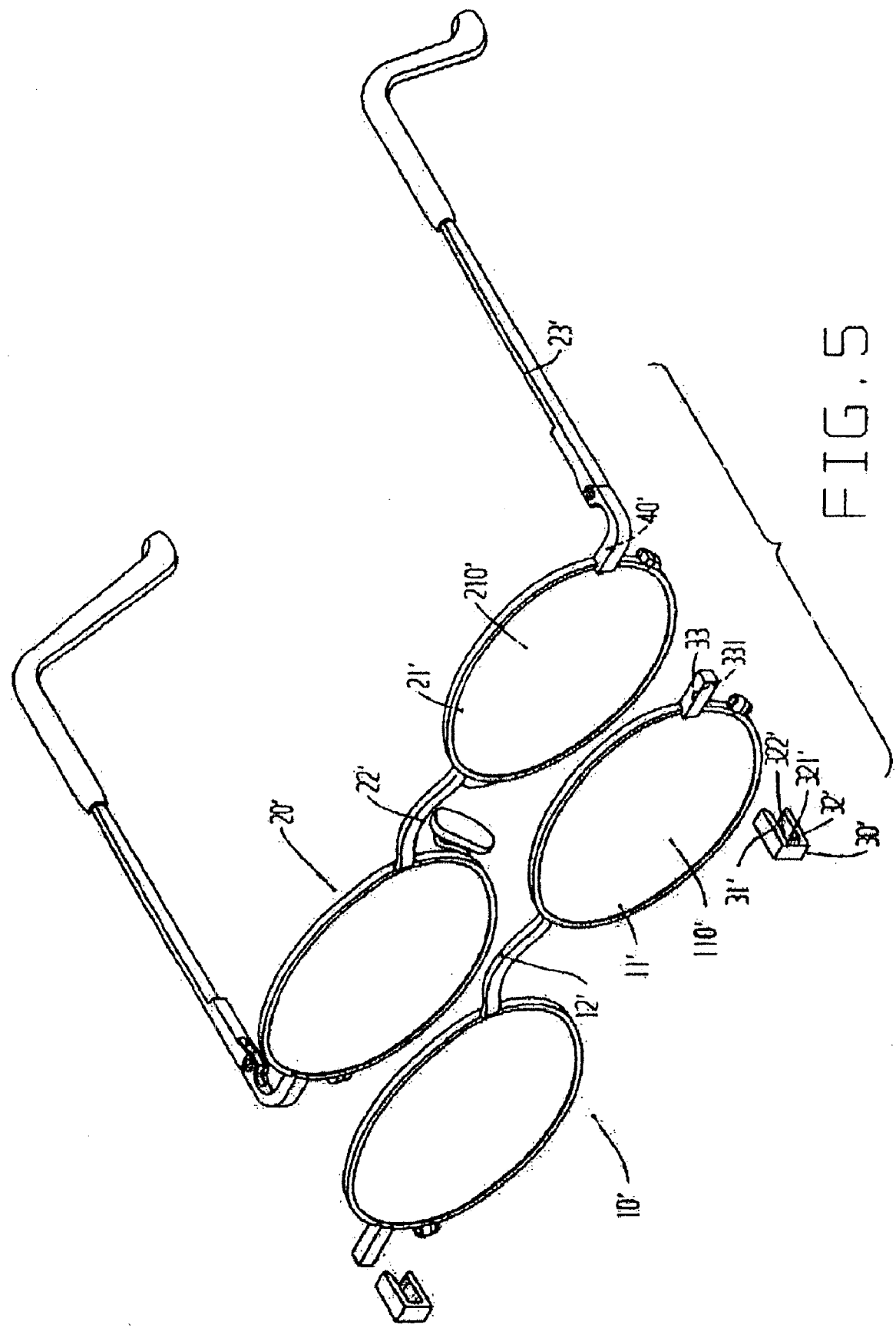

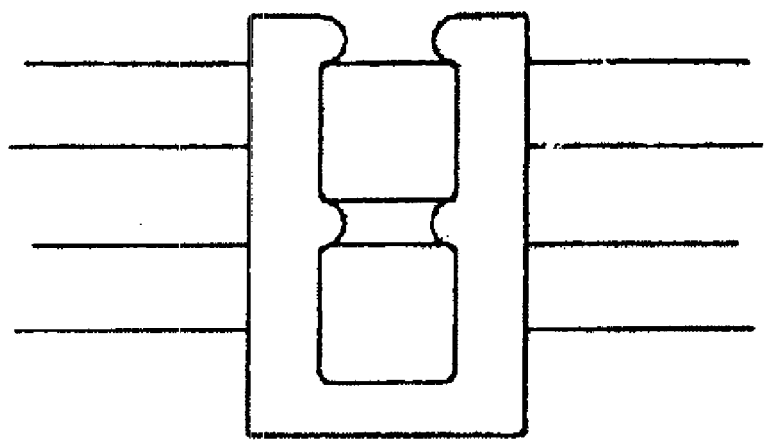
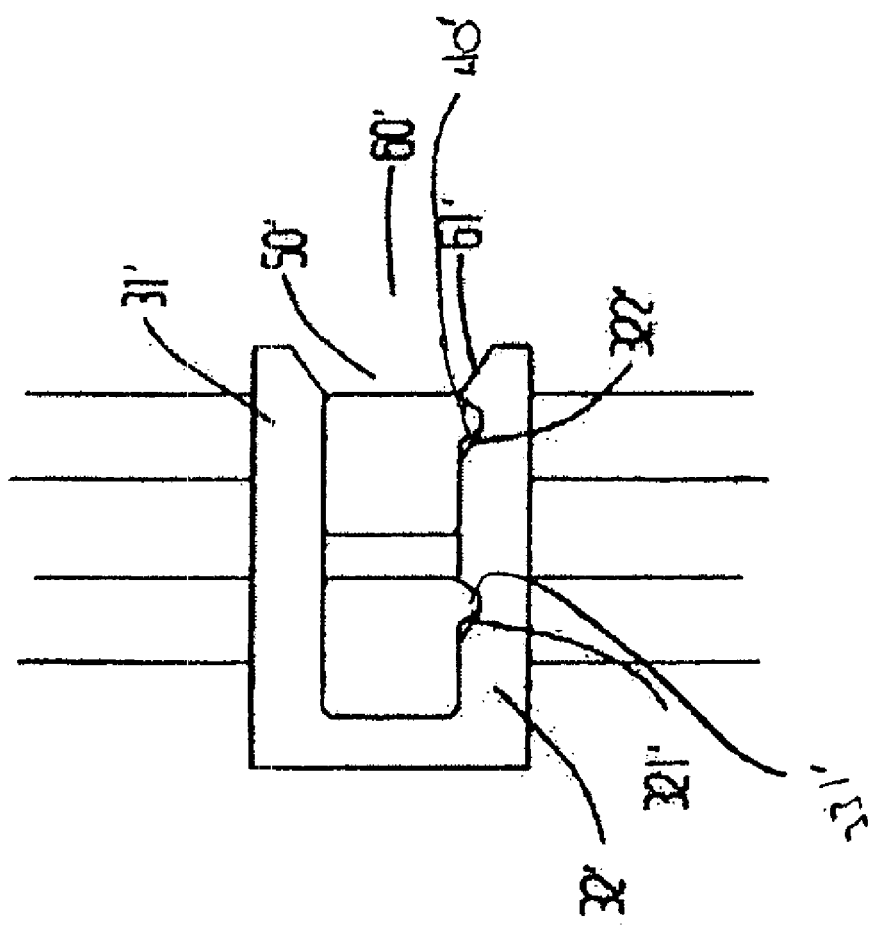

120
INTERCONNECTING ASSEMBLY IN COMBINATION WITH PRIMARY AND AUXILIARY EYEGLASSES

BACKGROUND OF THE INVENTION

1. Field of the Invention

One embodiment of the present invention relates to an interconnecting assembly in combination with primary and auxiliary eyeglasses. More particularly, the auxiliary eyeglasses may be able to be stably and detachably connected to the primary eyeglasses by the interconnecting assembly.

2. Description of Related Art

U.S. Pat. No. 6,264,323, which issued to Chao on Jul. 24, 2001, relates to an assembly of primary and auxiliary eyeglasses which are interconnected by a retainer clip.

U.S. Pat. No. 6,341,864, which issued to Ng on Jan. 29, 2002, relates to clip-on auxiliary lenses utilizing an elastic jaw in the shape of a half arch.

U.S. Pat. No. 6,375,322, which issued to Takagi on Apr. 23, 2002, relates to front hook eyeglasses and method of attaching front hook eyeglasses onto eyeglasses body.

BRIEF DESCRIPTION OF THE DRAWINGS

FIGS. 3A to 3C are embodiments of the present invention showing the clamping plate and the insert;

FIGS. 4A to 4D are other embodiments of the present invention showing the clamping plate and the insert;

FIG. 5 is an exploded perspective view of another embodiment of the present invention showing an interconnecting assembly in combination with primary and auxiliary eyeglasses;

FIGS. 6A and 6B are embodiments of the present invention showing the insert and the retainer of the interconnecting assembly in FIG. 5;

DETAILED DESCRIPTION OF THE INVENTION

Figure 1:
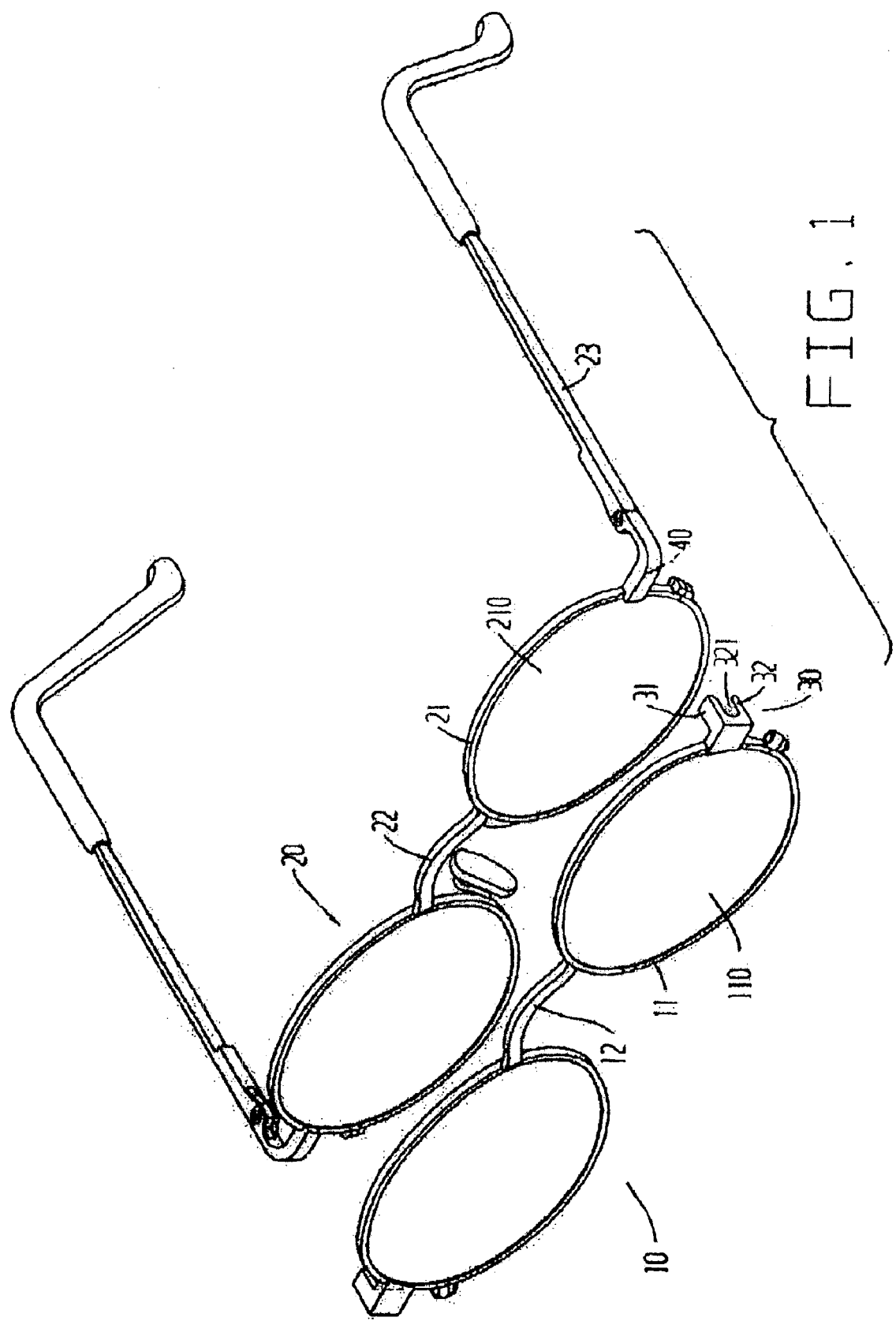
FIG. 1 is an exploded perspective view of an embodiment of the present invention showing an interconnecting assembly in combination with primary and auxiliary eyeglasses.

Referring now to FIG. 1, an embodiment of an eyeglasses assembly of the present invention is shown. As seen in this FIG. 1, the eyeglasses assembly has first a pair of eyeglasses (10) and a second pair of eyeglasses (20).

The first pair of eyeglasses (10) has a first frame (11) with two first lenses (110) stably held by the first frame (11) and a first bridge (12) interconnecting the two first lenses (110) together and forming the first frame (11) into one piece. The first frame (11) has two retainers (30) each formed on opposite sides of the first frame (11) and having an upper clamping plate and a lower clamping plate (31,32). The lower clamping plate (32) has a restricting groove (321) defined in a front portion of the lower clamping plate (32).

The second pair of eyeglasses (20) has a second frame (21) with two second lenses (210) stably held by the second frame (21), a second bridge (22) interconnecting the pair of second lenses (210) and forming the second frame (21) into one piece and two temples (23) each extending from opposite sides of the second frame (21). Each temple has a bottom face with a rib (40) formed on the bottom face e.g., adjacent the second lenses (210)), and the ribs correspond to the restricting grooves.

Figure 2C:
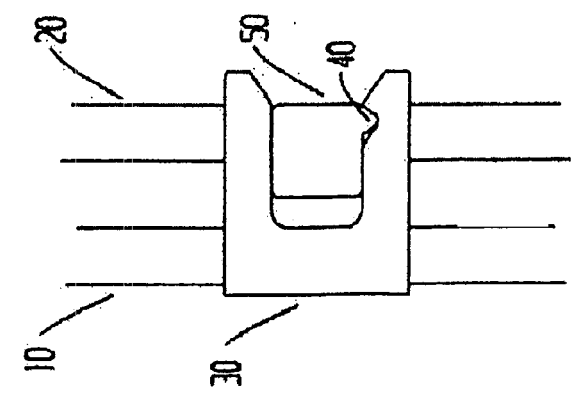
FIGS. 2A to 2C are a schematic views showing how the interconnecting assembly of an embodiment of the present invention is connecting the auxiliary eyeglasses to the primary eyeglasses.
Figure 2B:
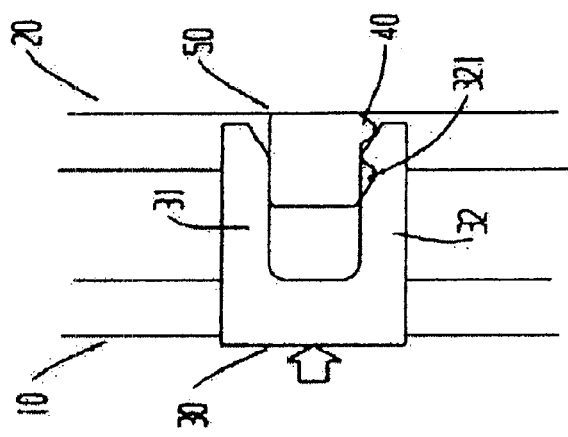
Figure 2A:
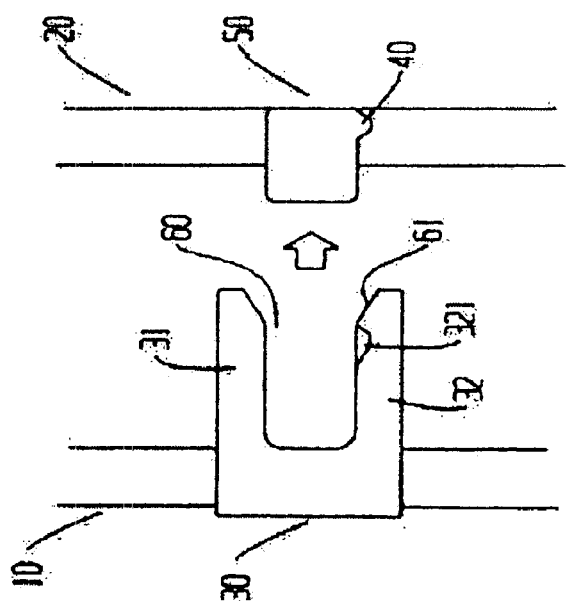

With reference now to FIGS. 1 and 2A to 2C, it is to be noted that the interconnecting assembly of this embodiment of the present invention comprises: (a) a pair of retainers (30) that are integrally formed on the first frame (11); and (b) a pair of ribs (40) that are integrally formed on the temples (23) (e.g., adjacent the second lenses (210)). A portion of each of the temples (23) provided with the rib (40) is hereinafter referred to as an insert (50) as shown in FIGS. 2A to 2C, for example.

It is noted that the upper clamping plate (31) has an inclined inner face formed on a free end of the upper clamping plate (31) and the lower clamping plate (32) also has an inclined inner face formed on a free end of the lower clamping plate (32), thereby forming a space (60) defined between the upper clamping plate (31) and the lower clamping plate (32) and having an enlarged opening (61). The restricting groove (321) is thus defined adjacent the inner inclined face of the lower clamping plate (32).

When the insert (50) is inserted between the upper clamping plate (31) and the lower clamping plate (32), the enlarged space (60) facilitates the entrance of the insert (50) into the retainer (30). After the alignment between the rib (40) and the restricting groove (321), the first pair of eyeglasses (10) is then securely mounted on the second pair of eyeglasses (20).

In order to facilitate the movement of the insert (50) into the retainer (30), unlike the embodiments shown in FIGS. 2A to 2C, the insert (50), as shown in the embodiment of FIG. 3A, has two truncated corners (51) formed on two opposite top and bottom faces of the insert (50) so that when the insert (50) initially moves into the retainer (30), neither of the upper and the lower clamping plates (31,32) will be forced to deform to allow the entrance of the insert (50) (until, of course, rib (40) enters the retainer (30)).

With reference to the embodiment of FIG. 3B (and in comparison with FIG. 3A), it is noted that the rib (40) is formed on a bottom face of the insert (50) in FIG. 3A and the rib (40) is formed on a top face of the insert (50) in FIG. 3B.

With reference to the embodiment of FIG. 3C, it is noted that the retainer (30) has two restricting grooves (311, 321) respectively defined in an inner face of the upper clamping plate (31) and an inner face of the lower clamping plate (32). The insert (50) then has two ribs (41) respectively formed on a top face and a bottom face of the insert (50) to correspond to the restricting grooves (311,321) of the insert (30).

FIG. 4A shows another embodiment of the present invention. As seen in this FIG. 4A, the retainer (30) has the enlarged opening (61) and a lower restricting boss (322) formed on the inner surface of the lower clamping plate (32).

The insert (50) has a lower recess (41) defined in a bottom face of the insert (50) to correspond to the lower restricting boss (322). With reference to the embodiment of FIG. 4B, the insert (50) has two truncated corners (51) respectively formed on opposite sides (i.e., top and bottom) of the insert (50) so that the retainer (30) does not need to have an enlarged opening (61) in this embodiment. With reference to the embodiment of FIG. 4C, a top restricting boss (311) is formed on an inner surface of the upper clamping plate (31) of the retainer (30). A top recess (42) is formed on a top face of the insert (50) to correspond to the top restricting boss (311). With reference to the embodiment of FIG. 4D, the retainer (30) has a lower restricting boss (322) and a top restricting boss (311). The insert (50) has a lower recess (41) and a top recess (42) respectively corresponding to the lower restricting boss (322) and the top restricting boss (311) so that after the movement of the insert (50) into the retainer (30), the mutual correspondence between the lower recess (41) and the lower restricting boss (322) and the top recess (311) and the top restricting boss (42) allows the retainer (30) to securely retain the insert (50) in the retainer (30) (that is, the first pair of eyeglasses (10) is securely connected to the second pair of eyeglasses (20)).

With reference now to FIG. 5, another embodiment of the interconnecting assembly in accordance with the present invention has a first pair of eyeglasses (10') and a second pair of eyeglasses (20').

The first pair of eyeglasses (10') of this embodiment includes a first frame (11') with two first lenses (110') stably held by the first frame (11') and a first bridge (12') interconnecting the two first lenses (110') together and forming the first frame (11') into one piece. The first frame (11') has two retainers (30') each disposed adjacent opposite sides of the first frame (11') and having an upper clamping plate and a lower clamping plate (31',32'). The lower clamping plate (32') has a first restricting groove (321') and a second restricting groove (322') defined in a portion of the lower clamping plate (32'). The first frame (11') further has two extensions (33) respectively formed on opposite sides of the first frame (11') to correspond to one of the retainers (30'). Each extension (33) has a first restricting boss (331') formed on a bottom face of the extension (33) to correspond to the first restricting groove (321').

The second pair of eyeglasses (20') of this embodiment has a second frame (21') with two second lenses (210') stably held by the second frame (21'), a second bridge (22') interconnecting the pair of second lenses (210') and forming the second frame (21') into one piece and two temples (23') extending from an opposite sides of the second frame (21'). The second frame (21') has two second restricting bosses (40') each formed on a bottom face of each of the temples (23') (e.g., adjacent the second lenses (210') of the second frame (22') to correspond to the second restricting groove (322').

With reference now to FIGS. 5, 6A and 6B, it is to be noted that the interconnecting assembly of the present invention of these embodiments comprises a pair of retainers (30') that are detachably connected to the first frame (11') and the second frame (21'). The interconnecting assembly further has the extension (33) with the first restricting boss (331') on the first frame (11') and the second restricting boss (40') on the second frame (20'). A portion of each of the temples (23') provided with the second restricting boss (40') is hereinafter referred to as an insert (50') as shown in FIGS. 6A and 6B, for example.

It is noted that the upper clamping plate (31') of these embodiments has an inclined inner face formed on a free end of the upper clamping plate (31') and the lower clamping plate (32') also has an inclined inner face formed on a free end of the lower clamping plate (32'), thereby forming a space (60') defined between the upper clamping plate (31') and the lower clamping plate (32') and having an enlarged opening (61'). When the insert (50') is inserted between the upper clamping plate (31') and the lower clamping plate (32'), the enlarged opening (61') facilitates the entrance of the insert (50') into the retainer (30'). After the alignment between the first and second restricting boss (331',40') and the first and second restricting groove (321',322'), the first pair of eyeglasses (10') is then securely mounted on the second pair of eyeglasses (20'). It is noted from FIG. 6B that the retainer (30') may have two pairs of restricting bosses (34) each spaced apart from the other one so that the extension (33) and a portion of one of the temples (23') are able to be securely retained by the retainer (30') after the extension (33) and a portion of one of the temples (23') are inserted into the retainer (30').

Figure 7:
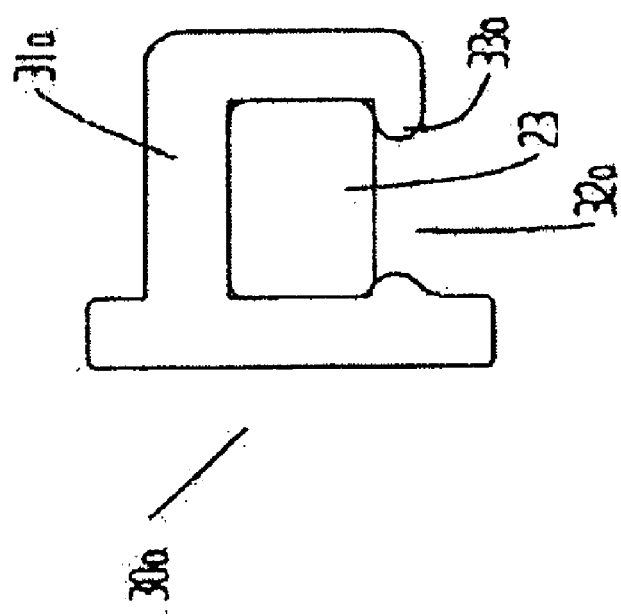
FIG. 7 is a schematic cross sectional view of another embodiment of the clamping plate and the insert according to the present invention.

With reference now to the embodiment of FIG. 7, it is noted that the retainer (30a) may be a hook (31a) with an opening (32a). The opening (32a) has two bosses (33a) respectively formed on opposite sides defining the opening (32a). Therefore, when a portion of one of the temples (23), as shown in FIG. 1, but provided without the rib (40), is inserted into the retainer (30a), the portion of the temple (23) is able to be securely retained by the retainer (30a).

Figure 8:
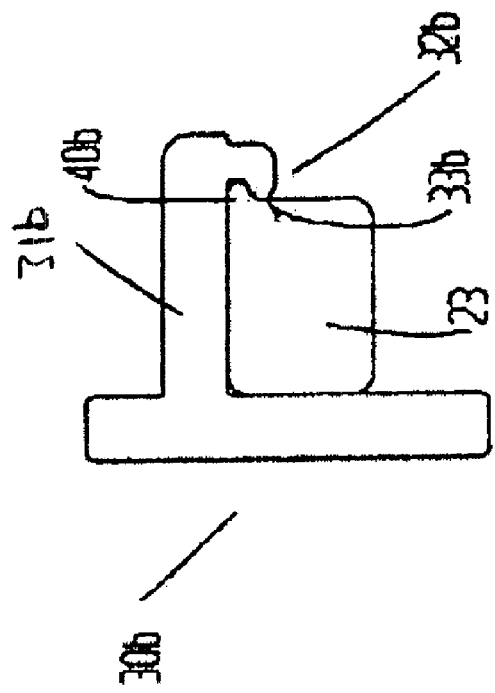
FIG. 8 is a schematic cross sectional view of another embodiment of the clamping plate and the insert according to the present invention.

With reference now to the embodiment of FIG. 8, it is noted that the retainer (30b) may be a hook (31b) with an opening (32b). The opening (32b) has one boss (33b) formed on a distal end of the hook (31b). Therefore, when a portion of one of the temples (23), as shown in FIG. 1, but without rib (40) and provided with a boss (40b) is inserted into the retainer (30b), the portion of the temple (23) is able to be securely retained by the retainer (30b).

Figure 9:
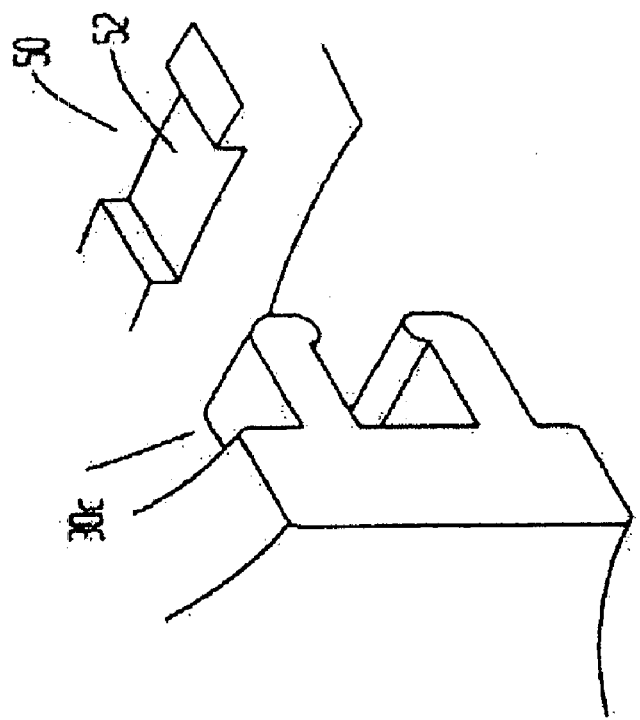
FIG. 9 is an exploded perspective view of another embodiment of the clamping plate and the insert according to the present invention.

With reference now to the embodiment of FIG. 9, it is noted that the retainer (30c) has a structure essentially the same as that of the retainer (30) shown in FIG. 3C. The insert (50) has a recessed face (52) corresponding to the retainer (30c) so that after the insert (50) is inserted into the retainer (30c), the insert (50) is able to be securely retained by the retainer (30c).

Figure 10:
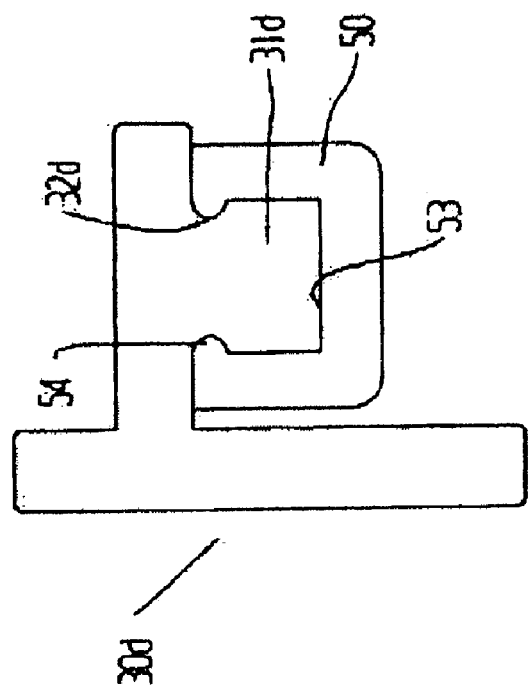
FIG. 10 is a schematic cross sectional view of another embodiment of the clamping plate and the insert according to the present invention.

With reference now to the embodiment of FIG. 10, it is noted that the retainer (30d) has a block (31d) with a neck (32d) formed on the block (31d). The insert (50) has a countersunk hole (53) with two limits (54) respectively formed on opposite sides of the temple (23) to correspond to the neck (32d) so that after the insert (50) is inserted into the retainer (30d), the relationship between the neck (32d) and the limits (54) is able to secure the insert (50) in the retainer (30d).

In another embodiment of the present invention an interconnecting assembly in combination with primary and auxiliary eyeglasses is provided (wherein the combination of the primary eyeglasses and the auxiliary eyeglasses is stable and easily accomplished).

In another embodiment of the present invention the clamping plates define an enlarged receiving opening between the clamping plates, so that the movement of the insert into the space between the clamping plates is easily accomplished.

In another embodiment of the present invention the insert may have two truncated corners (wherein the truncated corners may correspond to the space between the clamping plates so that the movement of the insert into the space between the clamping plates is easily accomplished).

While a number of embodiments of the present invention have been described, it is understood that these embodiments are illustrative only, and not restrictive, and that many modifications may become apparent to those of ordinary skill in the art. For example, the various mounting elements (e.g., ribs, grooves, etc.) may be mounted on any desired combination of surfaces (e.g., any combination of upper and/or lower surfaces). Further, any desired number of corresponding mating elements may be utilized.

What is claimed is:

1. An eyeglass assembly, comprising:
a pair of first eyeglasses having a first frame, a pair of first lenses held by the first frame and a first bridge interconnecting the pair of first lenses and forming the first frame into one piece;
a pair of second eyeglasses having a second frame, a pair of second lenses held by the second frame and a second bridge interconnecting the pair of second lenses and forming the second frame into one piece, the second frame having a pair of temples each formed on opposite sides of the second frame and being provided with at least one rib formed on each one of the temples of the second frame; and
two retainers respectively formed on opposite sides of the first frame to correspond to the ribs of the second frame, each retainer comprising an upper clamping plate, a lower clamping plate and a space defined between the upper clamping plate and the lower clamping plate, wherein each retainer has at least one restricting groove defined therein to correspond to a respective rib of the second frame so that combination of each respective rib and each respective restricting groove by inserting a portion of the temples into the retainer is able to combine the first pair of eyeglasses and the second pair of eyeglasses.

2. The eyeglass assembly as claimed in claim 1, wherein each upper clamping plate has a first inclined face formed on an inner face of the upper clamping plate and each lower clamping plate has a second inclined face formed on an inner face of the lower clamping plate to correspond to the inclined face of the upper clamping plate, thereby defining an enlarged opening communicating with the space defined between each upper clamping plate and each lower clamping plate.

3. The eyeglass assembly as claimed in claim 2, wherein there are two ribs respectively and oppositely formed on each of the temples and there are two restricting grooves respectively and oppositely formed on an inner face of the retainer to correspond to the two ribs.

4. The eyeglass assembly as claimed in claim 3, wherein: (a) each of the temples has a top face and a bottom face and the two ribs of each temple are respectively formed on the top face of the temple and the bottom face of the temple; and (b) the upper clamping plate of each retainer has an inner bottom face and the lower clamping plate of each retainer has an inner top face, wherein the two restricting grooves of each retainer are respectively formed on the inner bottom face of the upper clamping plate and the inner top face of the lower clamping plate to correspond to the two ribs of each temple.

5. The eyeglass assembly as claimed in claim 1, wherein the portion of each temple with the at least one rib has two truncated corners respectively formed on opposite faces of the temples to correspond to the space between the upper clamping plate and the lower clamping plate.

6. The eyeglass assembly as claimed in claim 1, wherein: (a) each of the temples has a bottom face and the at least one rib of each temple is formed on the bottom face of each of the temples; and (b) the lower clamping plate of each retainer has a top face and the at least one restricting groove of each retainer is defined in the top face of each lower clamping plate.

7. The eyeglass assembly as claimed in claim 1, wherein: (a) each of the temples has a top face and the at least one rib of each temple is formed on the top face of each of the temples; and (b) the upper clamping plate of each retainer has a bottom face and the at least one restricting groove of each retainer is defined in the bottom face of each upper clamping plate.

8. The eyeglass assembly as claimed in claim 1, wherein each retainer is detachably connected to one of two respective extensions oppositely formed on a side of the first frame and to a respective one of the temples of the second pair of eyeglasses, wherein the lower clamping plate of each retainer has two restricting grooves defined in a front portion of an inner face of the lower clamping plate to correspond to a respective rib of each temple and to a respective rib of each extension so that combination of the respective rib of each temple and to the respective rib of each extension and the two restricting grooves of each retainer is able to combine the first pair of eyeglasses and the second pair of eyeglasses.

9. The eyeglass assembly as claimed in claim 8, wherein each upper clamping plate has a first inclined face formed on an inner face of the upper clamping plate and each lower clamping plate has a second inclined face formed on an inner face of the lower clamping plate to correspond to the inclined face of the upper clamping plate, thereby defining an enlarged opening communicating with the space defined between each upper clamping plate and each lower clamping plate.

10. The eyeglass assembly as claimed in claim 9, wherein: (a) the upper clamping plate has two restricting grooves defined in an inner face of the upper clamping plate to correspond to two restricting grooves of the lower clamping plate; and (b) the restricting grooves of each upper clamping plate and the restricting grooves of each lower clamping plate are able to retain the extensions and a portion of each of the temples after movement of each respective one of the extensions and the portion of each respective one of the temples into the space between each upper clamping plate and each and lower clamping plate.

11. An eyeglass assembly, comprising:
a pair of first eyeglasses having a first frame, a pair of first lenses held by the first frame and a first bridge interconnecting the pair of first lenses and forming the first frame into one piece;
a pair of second eyeglasses having a second frame, a pair of second lenses held by the second frame and a second bridge interconnecting the pair of second lenses and forming the second frame into one piece, the second frame having a pair of temples each formed on opposite sides of the second frame and being provided with at least one recess defined in each one of the temples of the second frame, wherein each recess extends across substantially an entire width of a respective temple of the second frame from a front part of the temple to a rear part of the temple; and
two retainers respectively formed on opposite sides of the first frame to correspond to the recesses of the second frame, each retainer comprising an upper clamping plate, a lower clamping plate and a space defined between the upper clamping plate and the lower clamping plate, wherein each retainer has at least one restricting boss defined in the retainer such that the restricting boss is disposed beyond the rear part of the respective temple when a portion of each of the respective temples is placed into the respective retainer to combine the first pair of eyeglasses and the second pair of eyeglasses.

12. An eyeglass assembly, comprising:

a pair of first eyeglasses having a first frame a pair of first lenses held by the first frame and a first bridge interconnecting the pair of first lenses and forming the first frame into one piece;

a pair of second eyeglasses having a second frame, a pair of second lenses held by the second frame and a second bridge interconnecting the pair of second lenses and forming the second frame into one piece, the second frame having a pair of temples each formed on opposite sides of the second frame and being provided with at least one recess defined in each one of the temples of the second frame; and two retainers respectively formed on opposite sides of the first frame to correspond to the recesses of the second frame, each retainer comprising an upper clamping plate, a lower clamping plate and a space defined between the upper clamping plate and the lower clamping plate, wherein each retainer has at least one restricting boss defined in the retainer to correspond to the at least one recess of each temple of the second frame so that combination of each respective recess and each respective restricting boss by inserting a portion of the temples into the retainer is able to combine the first pair of eyeglasses and the second pair of eyeglasses;

wherein each of the retainers has two bosses, each of which bosses is respectively formed on a distal end of each upper clamping plate and each lower clamping plate such that after a portion of each temple with the at least one recess is inserted into a corresponding one of the retainers, the first frame is connected to the second frame.

* * * * *